US009292282B2

(12) United States Patent
Allen

(10) Patent No.: US 9,292,282 B2
(45) Date of Patent: Mar. 22, 2016

(54) SERVER-SIDE TRANSLATION FOR CUSTOM APPLICATION SUPPORT IN CLIENT-SIDE SCRIPTS

(75) Inventor: Joel B. Allen, Mebane, NC (US)

(73) Assignee: International Business Machines Corporation, Armonk, NY (US)

( * ) Notice: Subject to any disclaimer, the term of this patent is extended or adjusted under 35 U.S.C. 154(b) by 2027 days.

(21) Appl. No.: 12/415,069

(22) Filed: Mar. 31, 2009

(65) Prior Publication Data

US 2010/0250650 A1    Sep. 30, 2010

(51) Int. Cl.
*G06F 15/16* (2006.01)
*G06F 9/44* (2006.01)

(52) U.S. Cl.
CPC .................................. *G06F 8/76* (2013.01)

(58) Field of Classification Search
CPC ..................................................... G06F 8/76
USPC ......................................................... 709/203
See application file for complete search history.

(56) References Cited

U.S. PATENT DOCUMENTS

| 6,714,928 | B1 * | 3/2004 | Calow |
| 7,284,239 | B1 | 10/2007 | Young et al. |
| 7,788,341 | B1 * | 8/2010 | Burns .......................... 709/219 |
| 7,861,213 | B2 * | 12/2010 | Wang .......................... 717/100 |

OTHER PUBLICATIONS

Puder, A. "A cross-language framework for developing AJAX applications", PPPJ '07 Proceedings of the 5th international symposium on Principles and practice of programming in Java, ACM, pp. 105-112. 2007.*
Cetin et al. "Legacy Migration to Service-Oriented Computing with Mashups," Software Engineering Advances, 2007. ICSEA 2007. International Conference on , vol., no., pp. 21, Aug. 25-31, 2007.*
Samir et al. "Swing2Script: Migration of Java-Swing Applications to Ajax Web Applications," Reverse Engineering, 2007. WCRE 2007. 14th Working Conference on , vol., no., pp. 179-188, Oct. 28-31, 2007.*

(Continued)

*Primary Examiner* — John Macilwinen
(74) *Attorney, Agent, or Firm* — Steven M. Greenberg, Esq.; CRGO Law

(57) ABSTRACT

Embodiments of the present invention address deficiencies of the art in respect to server-side processing and provide a novel and non-obvious method, system and computer program product for performing server-side translation for custom application support in client-side scripts. In an embodiment of the invention, a method for supporting custom applications in client-side scripts can be provided. The method can include retrieving a client-side script, for execution in a client-environment and detecting an incompatibility of the retrieved client-side script resulting from a dependency of the client-side script upon an expected occurrence of an event in the client-environment. Thereafter, the retrieved script can be rewritten to manually invoke the expected event in the client-environment. Finally, the rewritten script can be compiled and cached, and the compiled and cached rewritten script can be delivered to the client-environment for execution therein.

6 Claims, 3 Drawing Sheets

(56) References Cited

OTHER PUBLICATIONS

Chu et al. "Automated Migration of List Based JSP Web Pages to AJAX," Source Code Analysis and Manipulation, 2008 Eighth IEEE International Working Conference on , vol., no., pp. 217-226, Sep. 28-29, 2008.*

"Server-Side Versus Client-Side Translation"; Oracle Java Server Pages Developers Guide and Reference Release 8.1.7; http://www.mscd.edu/~ittsdba/oradoc817/java_817/a83726/trandep2.htm.

* cited by examiner

SERVER-SIDE TRANSLATION FOR CUSTOM APPLICATION SUPPORT IN CLIENT-SIDE SCRIPTS

BACKGROUND OF THE INVENTION

1. Field of the Invention

The present invention relates to the field of server-side processing and more particularly to server-side translation for custom application support in client-side scripts.

2. Description of the Related Art

Internet server technology and web applications that use asynchronous Javascript (AJAX) and extensible markup language (XML) have become recently popular as developers have enjoyed enhanced user experience as well as significant performance gains. AJAX applications create a bridge by which a web browser can interact with the server to make partial page changes without reloading the entire web page. The asynchronous nature of AJAX allows multiple heterogeneous changes to occur simultaneously while also keeping main content on the page continuously visible to the end user. Unfortunately, web browsers have not yet been instrumented to keep up with new client environments, such as AJAX. As a result, supplemental applications need to overcome browser deficiencies and lack of support for web applications running in new client environments, including AJAX.

AJAX applications can exhibit adverse effects when interacting with applications that have been written exclusively for server-side processing, including legacy applications written before AJAX programming models were developed. As a result, certain applications do not function correctly when used within an AJAX wrapping application, especially when a web application server serves up multiple applications through an AJAX interface.

For instance, if an application uses paradigms that are only realized in a non-AJAX environment, such as a browser "load" event, the application will not work correctly if script/markup is requested asynchronously by the web application server. If the application contains an "onload" handler for the "load" event, but is requested asynchronously through an "XmlHttpRequest", the result when the Javascript code in the application server loads the response markup into the page will be that the markup will never run its "onload" handler because the "load" event has already been fired by the browser when the page was initially loaded.

While there are current techniques of executing these "onload" handlers manually, the problem occurs when the markup is returned multiple times since the handler may execute correctly the first time, but returns immediately on all subsequent requests since prior execution. For instance, on the "load" event, calling a Javascript function parses the page markup and adds functionality to markup found on the page. The parser would be able to run on the first application that was loaded, but not on any subsequent applications because the parser would detect prior execution.

In order to adequately recover from the above situation, the "onload" handler must be function appropriately within an AJAX environment. While prior attempts include managing script processing on the client, the code required is complicated and tedious to execute without sacrificing performance on the client. While the client-side code parses and rewrites the "onload" handler, utilizing current techniques can decrease performance gains from AJAX, An additional drawback of rewriting scripts on the client-side includes providing benefit to only the current user in the current browser. Therefore, the server would lack any awareness of the improvement made to the "onload" handler in order to make the handler work within the AJAX environment. As a result, multiple users using multiple browsers would not benefit from the improved function. Disadvantages of rewriting scripts on the client-side can also occur in other environments other than AJAX.

Current techniques on the client-side are limited to improving functions within a client-side environment that cannot inherently support all programming paradigms. Therefore, there is a need to overcome the deficiencies with the prior art and more particularly for a more efficient way to support server-side translation of client-side scripts.

BRIEF SUMMARY OF THE INVENTION

Embodiments of the present invention address deficiencies of the art in respect to server-side processing and provide a novel and non-obvious method, system and computer program product for performing server-side translation for custom application support in client-side scripts. In an embodiment of the invention, a method for supporting custom applications in client-side scripts can be provided. The method can include retrieving a client-side script, for execution in a client-environment and detecting an incompatibility of the retrieved client-side script resulting from a dependency of the client-side script upon an expected occurrence of an event in the client-environment. Thereafter, the retrieved script can be rewritten to manually invoke the expected event in the client-environment. Finally, the rewritten script can be compiled and cached, and the compiled and cached rewritten script can be delivered to the client-environment for execution therein.

In another embodiment of the invention, a data processing system can be configured for translating client-side scripts. The system can include a memory, a processor and server-side processing logic executing in the memory by the processor. The logic can include program code enabled to retrieve a client-side script, for execution in a client-environment, to detect an incompatibility of the retrieved client-side script resulting from a dependency of the client-side script upon an expected occurrence of an event in the client-environment and, to rewrite the retrieved script to manually invoke the expected event in the client-environment.

Additional aspects of the invention will be set forth in part in the description that follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for performing server-side translation for custom application support in client-side scripts. In accordance with an embodiment of the present invention, script logic can be rewritten for execution in heterogeneous browser environments. Specifically, markup can be parsed to identify a script dependent upon an occurrence of a browser environment event when interpreted and/or executed in the browser environment. Thereafter, the identified script can be rewritten to ensure manual invocation of the browser environment event. In this regard, before delivering the markup to the browser environment for rendering and execution, a directive manually invoking the environment event can be inserted into the identified script. Thereafter, the markup with re-written script can be forwarded to the browser environment for rendering and execution. Consequently, despite the dependency of the script on the possible but not guaranteed occurrence of the browser environment event, the script still can be processed by ensuring the occurrence of the expected event.

Figure 1:
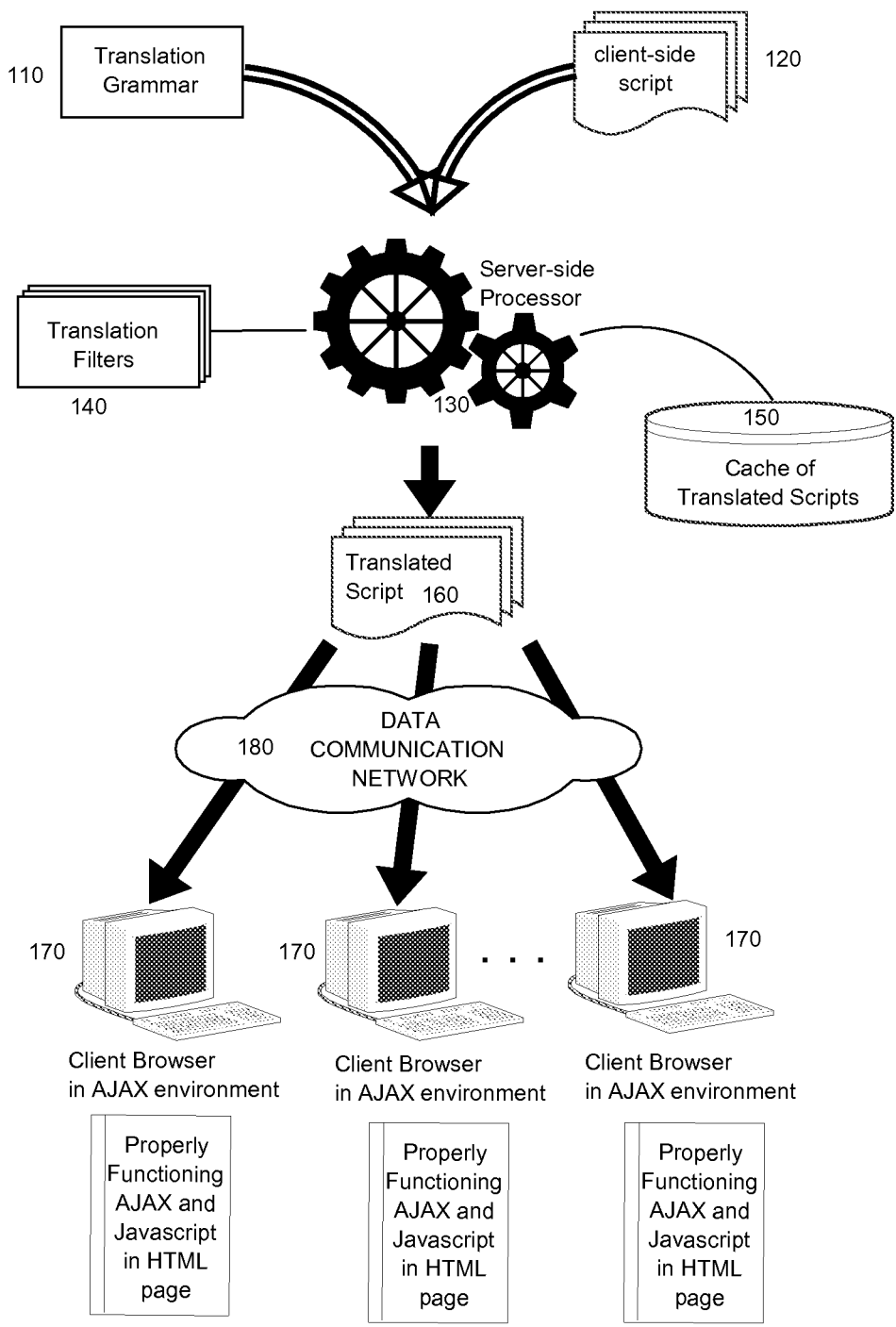
FIG. 1 is a pictorial illustration of a process for performing server-side translation for custom application support in client-side scripts.

In illustration, FIG. 1 pictorially depicts a process for performing server-side translation for custom application support in client-side scripts. As shown in FIG. 1, individual ones of computing clients 170 can request client side scripts 120 as part of requests for markup from a content source (not shown) over data communication network 180 for rendering in a hosted browser environment. Server-side processor 130 executing in memory in a computing system can apply a translation grammar 110 to a retrieved client side script 120 requested by an individual one of the computing clients 170 to dictate the manner of translation (rewriting) of the retrieved client-side script 120.

In this regard, after retrieving a client-side script 120 associated with requested markup requested by a requesting one of the computing clients 170, the server-side processor 130 can detect an incompatibility of the retrieved client-side script 120 resulting from a dependency of the client-side script 120 upon the occurrence of an expected event in the browser environment of the requesting one of the computing clients 170. Thereafter the server-side processor 130 can rewrite the retrieved client-side script 120 into a translated script 160 based on translation filters 140 and translation grammar 110. In particular, the translation filters 140 can include dynamic filter expressions and/or lists of identifiers of pre-built filters. In either case, the translation filters 140 specify how the retrieved client-side script 120 is to be parsed and translated in order to manually invoke an event whose occurrence is expected for the proper functioning of the client-side script 120.

Thereafter, the translated script 160 can be stored in a cache 150 of translated scripts ready to be sent to the requesting one of the computing clients 170. As such, the translated script 160 can be repeated served to others of the computing clients 170 requesting the same client-side script 120. It will be recognized by the skilled artisan, then, that the server-side processor 130 can accomplish a scalable, centralized, and dynamic method of providing custom client-side application support by translating client-side script code into a compatible form that allows successful implementation by the client environment, such as an AJAX environment.

Figure 2:
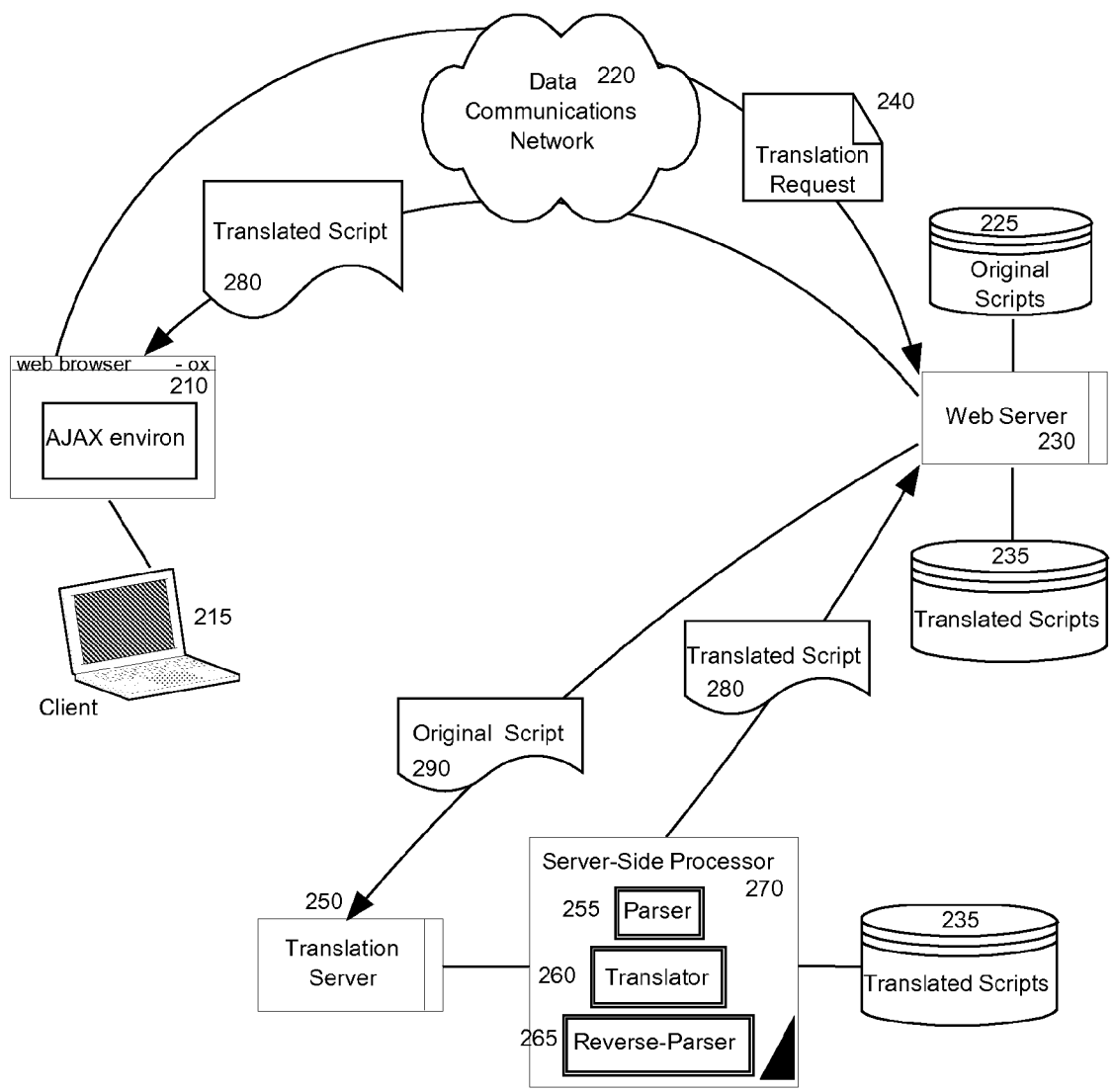
FIG. 2 is a schematic illustration of a server-side translation data processing system configured for custom application support in client-side scripts.

The process illustrated in connection with FIG. 1 can be performed within a server-side translation data processing system. In further illustration, FIG. 2 schematically shows a server-side translation data processing system configured for custom application support in client-side scripts. The system can include a host server such as a web server 230 executing in a computing platform including one or more computers, each with a processor and memory. The web server 230 can be coupled to both a client-side script data storage 225 and a translated script data storage 235. A client browser executing in a client computer 215 providing a custom client environment 210, such as an AJAX configured browser environment, further can be communicatively coupled to the web server 230 over a computer communications network 220. Finally, a server-side processor 270, having a parser 255, translator 260, and reverse-parser 265 can be coupled to a translation server 250. Notably, translated script data storage 235 housing copies of translated scripts 280 further can be provided.

In operation, the custom client environment 210 can send a translation request 240 of a client-side script 290 referenced in markup for rendering in the custom client environment 210 to the web server 230 through the computer communications network 220. In this regard, the translation request 240 can include a URL link pointing to the client-side script 290, such as a javascript, stored in the client-side script data store 225 of the web server 230. The server-side processor 270 by way of the parser 255 can parse the client-side script 290 into parsed tokens. Thereafter, the translator 260, by reference to a table as an example, can translate the parsed tokens of the client-side script 290 to determine whether or not an incompatibility of the client-side script 290 exists resulting from a dependency of the client-side script 290 upon an expected occurrence of an event in the custom client-environment 210.

To the extent that an incompatibility is determined, the server-side processor 270 can rewrite the client-side script 290 through the modification of the tokens, the deletion of particular ones of the tokens, or insertion of new tokens, in order to configure a translated form of the client-side script 290 to manually invoke the expected event in the custom client-environment 210. Finally, the server-side process 270 through reverse-parser 265 can reconstruct the translated form of the client-side script 290 from the new set of tokens and the server-side process 270 can return the translated script 280 to the web server 230 for distribution to the custom client environment 210.

Figure 3:
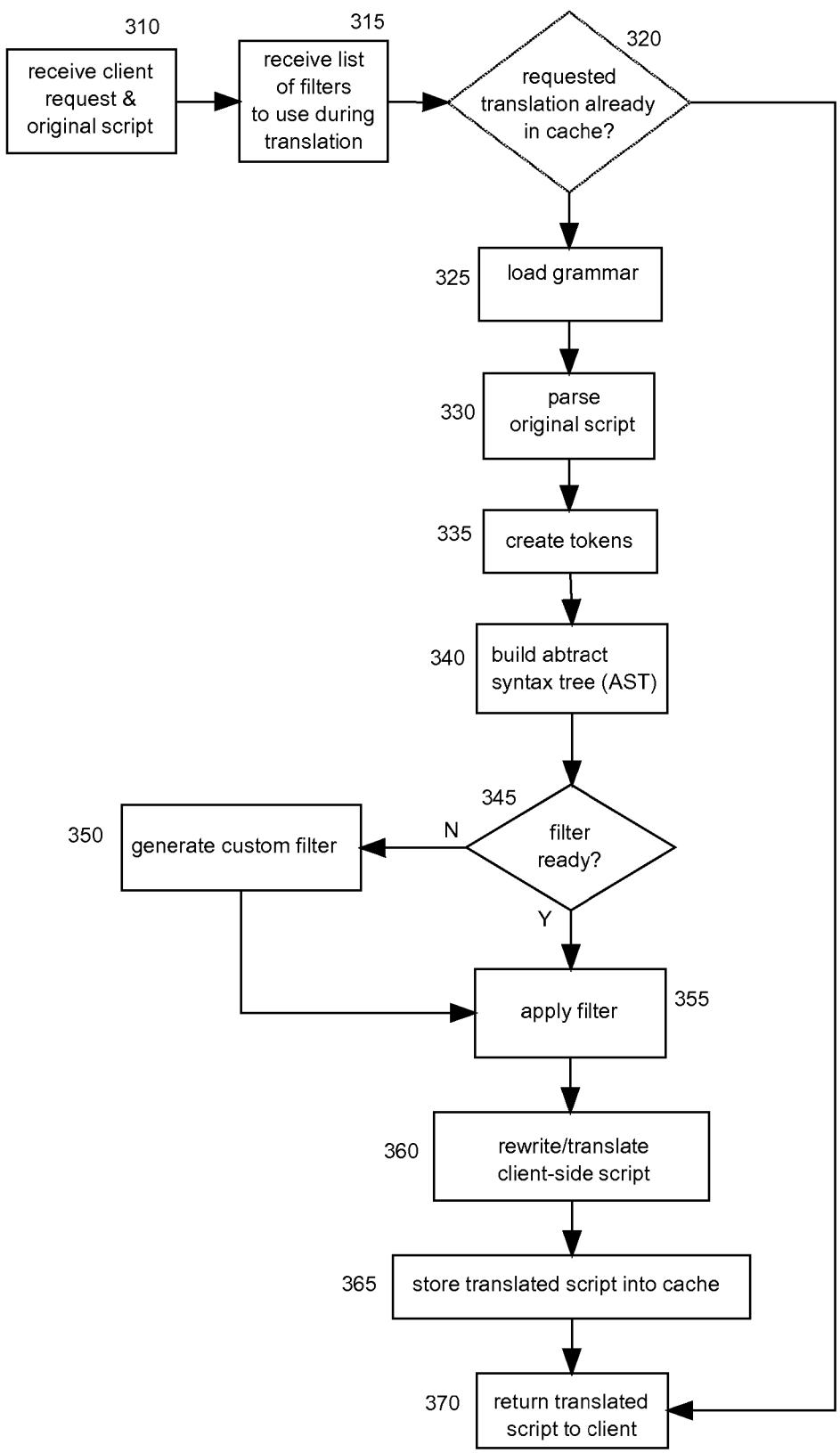
FIG. 3 is a flowchart illustrating a process for performing server-side translation for custom application support in client-side scripts.

The achieve the functionality described herein, the server-side processor 270 can include computer usable program code which when executed in memory by a processor of a computing platform, can be enabled to provide custom client-side application support on the server-side. In illustration of the operation of the program code of the server-side processor 270, FIG. 3 is a flowchart illustrating a process for performing server-side translation for custom application support in client-side scripts. Starting in block 310, a script request embedded in markup to be served to a client requesting the markup for rendering in a client side browser environment can be received in the server-side processor for translation.

The request can include an original client-side script URL. Based upon the original client-side script URL, the server can access a script referenced by the original client-side script URL for translation. It will be recognized by the skilled artisan that the original client-side script URL alternatively can reference the same server hosting an application utilizing the script, or the original client-side script URL can reference a different server than the server hosting the application utilizing the script. In either case, in block 315 filter parameters can be extracted from the request in conjunction with the original client-side script URL and can include dynamic filter expressions using custom expression language or a list of identifiers of pre-built filters already existing on the server.

For example, a request can take the exemplary form as follows

"http://myserver.domain.com/wps/portal/
translatorServlet?url=http/myserver. domain.com/wps/
portal/myJavascript.js&filters=AJAX_filter"

that includes both a specification of the original client-side script URL referencing the Javascript entitled "myJavascript.js" and also the filter parameters "AJAX_filter" referencing a pre-built filter for the AJAX browser environment. Next, in decision block 320, if an already-translated form of the script is present in the server cache store (data store), the server can send the cached translated script to the client, as illustrated in block 370. In this regard, each cached and translated script can have a unique identifier allowing ready access to the translated script. Thus, a client-side script may have been translated multiple times by different filters, and the server cache may keep a single copy of each of these translated scripts in the cache store for later retrieval.

In decision block 320, if there is no pre-existing cached translated script, the server-side processor in block 325 can load a translation grammar necessary to instruct a parser in parsing the client-side script, depending on type and language of the script. For instance, the translation grammar can be provided as input to the parser. With the relevant grammar dictating the parsing, the content of the client-side script can be read and in block 330, the client-side script can be parsed according to the translation grammar. Next in block 335, based on the grammar, tokens can be created for the parsed client-side script. In block 340, an abstract syntax tree (AST) can be constructed by the parser while the parser reads the created tokens. The AST can provide a raw hierarchy of the client-script script with flexible nodes that can be manipulated depending on which filter is used on the AST.

In decision block 345, if there is not a pre-existing filter to be used, a custom filter can be generated, as shown in block 350, depending on the parameters passed by the client, which may include dynamic filter expressions that comply with custom filtering language that provides patterns and rules for the translator to walk and modify the AST. The filter can include a set of patterns/rules, and expressions that walk through the AST in order to find nodes that satisfy the patterns/rules. Applying the filter can include applying a given expression to the node for manipulation. For example, filter operations include, but are not limited to, simple operations like creating, modifying, and deleting nodes in the AST, and even include allowing more complicated operations like reorganizing or restructuring the AST according the patterns/rules being applied.

If there are pre-existing filters to be used as directed by the request parameters, then in block 355 the filter can be applied to the AST. Applying a filter can include walking the AST of a javascript code, and upon seeing a specified pattern, can add an additional sub tree in the AST. Next in block 360, a reverse-parser or translator that walks the tree and outputs script can transform the AST into a rewritten version of javascript that has been translated based on the applied filters. Thus, a functional javascript can be produced to properly execute in the client-environment, such as an AJAX environment. For exemplary purposes, a "before" and "after" pseudo-javascript is given below in Table 1.

TABLE 1

| Before Translation | After Translation |
| --- | --- |
| <script><br>var node = document.getElementById('someId');<br>node.addEventListener("load", functionPointer);<br>//node.addEventListener is a W3C standard API, but this would be node.attachEvent in Internet Explorer<br></script><br><img src="/path/to/my/image.png" onload="callMyFunction( )"/> | <script><br>var node = document.getElementById('someId');<br>node.addEventListener("load", functionPointer); //<br>node.addEventListener is a W3C standard API, but this would be node.attachEvent in Internet Explorer<br>// This next statement is added by the translator<br>CLIENT_ENVIRONMENT.addListener(node, "load", functionPointer);<br></script><br><img src="/path/to/my/image.png" onload="callMyFunction( )" id="translatorAddedUniqueID"/><br><!-- Script added by translator below --><br><script><br>var node = document.getElementById('translatorAddedUniqueID');<br>CLIENT_ENVIRONMENT.addListener(node, "load", "callMyFunction");<br></script> |

The first column in Table 1 above shows the original client-side script before translation. When the server-side processor translates the client-side script, both the "addEventListener" call and the onload attribute on the "<img> element" can be detected by applying the filter. An exemplary way for to apply the filter can include adding additional script code and calling a client-side Application Programming Interface (API) that the environment exposes for getting notifications about these types of listeners so that it can execute them manually. Thereafter, in block 365, the translated script can be stored locally on the server in a cache store. Finally in block 370 the translated script can be sent to the client that can be executed in the particular client environment, such as AJAX environment.

Essentially without any complicated code on the client side, an exemplary embodiment can accomplish a scalable, centralized, and dynamic method of providing custom client-side application support on the server side by translating client-side script code into a form that makes the rewritten script perform as expected by the client environment, such as AJAX environment.

Notably, in one embodiment, the client-side script can reside on the same server that is doing the translation. In cases where a web page executes a script that resides on another domain, the web page usually can make a request through a proxy on its own domain. Alternatively, when the client requests a translated version of the script, the server can forward the specific request to a translation server behind the scenes so that the translation server can translate scripts for the web server, which can subsequently send the translated script back to the client. From the client's perspective, the web server implements the translation even though another translator server is actually doing the translation. Either embodiment can be implemented to support server-side translation of client-side script code.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for performing server-side translation for supporting custom applications in client-side scripts comprising:
    retrieving a client-side script, for execution in a client-environment;
    detecting an incompatibility of the retrieved client-side script with the client-environment, resulting from a dependency of the client-side script upon an expected occurrence of an event in the client-environment; and,
    rewriting the retrieved client-side script to manually invoke the expected event in the client-environment.

2. The method of claim 1, further comprising:
    compiling the rewritten retrieved client-side script;
    caching the rewritten retrieved client-side script; and
    delivering the compiled and cached rewritten retrieved client-side script to the client-environment for execution therein.

3. A data processing system configured for translating client-side scripts comprising:
    a memory;
    a processor; and
    server-side processing logic executing in the memory by the processor, the server-side processing logic comprising program code enabled to retrieve a client-side script, for execution in a client-environment, to detect an incompatibility of the retrieved client-side script with the client-environment, resulting from a dependency of the client-side script upon an expected occurrence of an event in the client-environment and, to rewrite the retrieved client-side script to manually invoke the expected event in the client-environment.

4. A computer program product comprising a computer usable medium, where the medium does not include a signal, embodying computer usable program code for supporting custom applications in client-side scripts, the computer program product comprising:
    computer usable program code for retrieving a client-side script;
    computer usable program code for detecting an incompatibility of the retrieved client-side script with the client-environment, resulting from a dependency of the client-side script upon an expected occurrence of an event in the client-environment; and
    computer usable program code for rewriting the retrieved client-side script to manually invoke the dependency to the expected event in the client-environment.

5. The computer program product of claim 4, further comprising computer usable program code for compiling the rewritten retrieved client-side script, caching the rewritten retrieved client-side script, and delivering the compiled and cached rewritten retrieved client-side script to the client-environment for execution therein.

6. The data processing system of claim 3, wherein the server-side processing logic further comprises program code enabled to compile the rewritten retrieved client-side script, to cache the rewritten retrieved client-side script, and to deliver the compiled and cached rewritten retrieved client-side script to the client-environment for execution therein.

* * * * *